United States Patent [19]

Siegel

[11] 3,919,430

[45] Nov. 11, 1975

[54] WATER ABSORPTION BASE

[75] Inventor: Frederick P. Siegel, Lincolnwood, Ill.

[73] Assignee: Akzona Incorporated, Asheville, N.C.

[22] Filed: Jan. 28, 1974

[21] Appl. No.: 437,418

[52] U.S. Cl. .............. 424/365; 424/170; 424/308; 424/358; 252/351; 252/DIG. 5; 424/238
[51] Int. Cl.$^2$ ................... A61K 7/48; A61K 47/00
[58] Field of Search .................. 424/365, 358, 170

[56] References Cited
UNITED STATES PATENTS

| | | | |
|---|---|---|---|
| 2,114,490 | 4/1938 | Harris | 424/365 |
| 2,372,807 | 4/1945 | Brown | 424/365 |

OTHER PUBLICATIONS

DeNavarre, "The Chemistry & Manufacture of Cosmetics," 2nd Ed. Vol. II, Cosmetic Materials, -pp/ 84, 85, 89, 97, 98, 99 & 100 (1962).
The Pharmacopeia of the U.S.A., Seventeenth Revision, (1965), pp. 448–499, 668, 786, 787 & 789.

*Primary Examiner*—Donald B. Moyer
*Attorney, Agent, or Firm*—Francis W. Young; Philip M. Pippenger

[57] ABSTRACT

Compositions useful in cosmetic and pharmaceutical formulations comprising at least about 75% petrolatum and a combination of minor amounts each of four emulsifiers in certain proportions: 1) 1.5 – 10% by weight of either sorbitan monooleate or ethoxylated (3 moles ethylene oxide) oleic acid; 2) 0.6 – 3% by weight of either glycerol monooleate or glycerol monolaurate; 3) 0.45 – 1.5% cetyl alcohol; and, 4) 0.45 – 1.5% by weight stearyl alcohol. The compositions are superior to lanolin or lanolin derivative per se or water absorption bases containing either in that they are stable water-in-oil emulsions having Water Numbers in excess of 400, are not allergenic, and are not as subject to oxidative attack during shelf life that can cause discoloration and odor formation.

3 Claims, No Drawings

WATER ABSORPTION BASE

BACKGROUND OF THE INVENTION

This invention relates to water absorption bases which are used in the preparation of cosmetic and pharmaceutical compositions.

Cosmetic and pharmaceutical formulations utilizing some of the constituents of the present invention are well known and can be represented by some of the following U.S. Pats.: Reissue Patent Nos. Re 27,253 and Re 20,361; Pat. Nos. 1,958,700; 2,322,820; 2,372,807; 2,583,576; 2,854,378; 2,942,008; 2,987,446 and 3,536,816.

The best known and almost universally used water absorption bases for cosmetic and pharmaceutical formulations contained significant amounts of lanolin and lanolin derivatives. Lanolin, however, has poor color and color stability, develops odors, imparts stickiness to formulations, is susceptible to oxidative attack and is reported to be allergenic. Furthermore, lanolin has shortcomings in terms of its ability to absorb water (the primary qualification of a water absorption base). The parameter used to measure the performance of a water absorption base is its "Water Number." Water Number was originally defined by Casparis and Meyer (*Pharm. Acta. Helv.*, Vol. 10, p. 163, 1935) as the maximum number of grams of water that will form a stable water-in-oil emulsion with 100 grams of the water absorption base. For example, a Water Number of 400 means that 100 parts of the base will combine with 400 parts of water. This test has been expanded to give a measure of extended packaging or shelf lift by examining the water absorption base at the designated Water Number after 48 hours, both at 77°F and at 100°F. If the particular water emulsion (Water Number) does not separate within 48 hours at both temperatures, it is judged to be stable under normal conditions. This criterion is perhaps the most important test of whether a water absorption base having a certain Water Number is suitable for use in cosmetics and pharmaceutical formulations because of the requirement of long shelf life without separation of the product.

While lanolin has a Water Number of 475 when freshly prepared, on aging, even while refrigerated, this value drops to <190. It has been suggested that the latter value should be considered a more nearly true value (*Chemistry and Manufacture of Cosmetics* by M. G. deNaVarre, D. Van Nostrand, 1941, page 66).

Numerous attempts have been made over the years to overcome the above mentioned drawbacks, but none have been completely successful. Such attempts have mostly centered on modifying lanolin chemically to reduce one or more of the disadvantages enumerated above; none of the derivatives produced, however, have eliminated all the disadvantages and their cost is considerably higher than lanolin. The compositions of the present invention overcome the disadvantages mentioned, exhibits a Water Number of 400 or greater which remain constant with age, and in addition, are lower in cost than lanolin derivatives.

SUMMARY OF THE INVENTION

The invention is directed to compositions which exhibit to a very high degree the ability to absorb water and which thus find utility as a water absorption base in cosmetic and pharmaceutical formulations. The compositions of the invention have a Water Number of at least 400 which remains stable for a minimum of 48 hours at 100°F.

Most particularly, it has been found that petrolatum can be emulsified with certain combinations of four of the following materials to obtain compositions having the above mentioned properties: (1) sorbitan monooleate or ethoxylated (3 moles ethylene oxide) cleic acid; (2) glycerol monooleate or glycerol monolaurate; (3) cetyl alcohol; and (4) stearyl alcohol in specific proportions. In particular, the water absorption base composition comprises at least 75% by weight of petrolatum and minor amounts of each of an emulsifier from each of the four groups just mentioned and may contain small amounts of a bacterial control agent, such as propyl p-hydroxybenzoate (propyl paraben). While some petrolatums give better results than other petrolatums, and are preferred, all petrolatums are found to be useful in the invention. Water absorption bases within the following ranges are found to exhibit Water Numbers of at least 400 and are stable water-in-oil emulsions, i.e. do not separate, when heated at 110°F for a minimum of 48 hours: petrolatum 85 – 95%; sorbitan monooleate 1.5 – 10%; glycerol monooleate 0.6 – 3%; cetyl alcohol 0.45 – 1.5%; and stearyl alcohol 0.45 – 1.5%. Oleic acid ethoxylated with about 3 moles ethylene oxide can be used in place of sorbitan monooleate, and glycerol monolaurate can be substituted for glycerol monooleate in the above ranges.

Compositions within the following ranges have Water Numbers in excess of 800 and are stable at this Water Number for at least 48 hours at 110°F and, hence, are preferred: about 90% petrolatum; about 0.65% each of cetyl alcohol and stearyl alcohol; 5 – 7% sorbitan monooleate and 1 – 2% glycerol monooleate.

A preservative such as methyl p-hydroxybenzoate (methyl paraben) or propyl p-hydroxybenzoate (propyl paraben) may be incorporated in the above formulation in an amount sufficient to control bacteriological growth in the water absorption base, usually around 0.1 – 0.2%.

DETAILED DESCRIPTION OF THE INVENTION

It has been observed that petrolatums of various fiber lengths (short, medium, long) made from Pennsylvania crude oils give the highest Water Numbers and are the most stable as determined by the elevated temperature storage tests described hereinafter and thus are preferred. However, a short fiber petrolatum from a mid-continent crude oil (Amojel Snow White) gave satisfactory results but not as good as the Pennsylvania Crudes. Petrolatums derived from Pennsylvania crude oils that have been used with good effect include: Protopet 1-S regular (short fiber petrolatum marketed by Witco); Protopet 1-S (long fiber); Protopet 2-L (long fiber); Amojel long fiber (Amoco) Penreco short, medium and long fibers (Penreco). The only factor that appears critical is that a large proportion of petrolatum be used in relation to the total amount of emulsifiers used in the base formulation. For the purposes of this invention at least 75% petrolatum is used and preferably, 85 – 95%.

Four emulsifiers are selected from the following: sorbitan monooleate; glycerol monooleate; glycerol monolaurate; oleic acid ethoxylated with 3 moles of ethylene oxides; cetyl alcohol and stearyl alcohol. A first emulsifier either sorbitan monooleate or oleic acid ethoxylated with 3 moles of ethylene oxide may be incorporated in amounts ranging from 1.5 to 10% by weight of the water absorption base although amounts from 5 – 7% by weight are preferred. A second emulsifier selected from the group consisting of glycerol monooleate and glycerol monolaurate is added in amounts from about 0.6% to about 3% by weight.

Two specific emulsifiers, which additionally function as emollients, cetyl alcohol and stearyl alcohol, are added in small amounts in the range of 0.45 – 0.9% by weight each and preferably, in equal quantities.

While the materials utilized in my water absorption base are well known and commonly used in cosmetic and pharmaceutical preparations, I have found, unexpectedly, a composition, that, in the proportions disclosed herein, has water absorption properties combined with other properties and a degree of heat stability not found in other materials heretofor used for this purpose.

The most commonly used water absorption base, lanolin, has a Water Number of over 400, when freshly prepared, which rapidly drops to below 200. The Water Number is a direct measure of how much water can be absorbed by a base material and is an essential criteria of the suitability of the material for cosmetic and pharmaceutical preparations. Further, to be useful, the level of the Water Number must remain high and not diminish with age. A simple test to determine the stability of a water absorption base comprises heating a sample combined with a given amount of water (i.e., at a specific Water Number) in an oven at 110°F for 48 hours. To be considered stable at the designated Water Number, the emulsion must not separate during the 48 hour period.

EXAMPLES

The invention will be illustrated with a number of examples setting forth various compositions which are stable at Water Numbers of 400 or more as shown by the heat (aging) stability test described above. Each of the compositions was formulated in the proportions, by weight percentage, stated below in the tables by thoroughly mixing the ingredients in any order desired, in a blender. The Water Number is then determined by adding hot (140°F) water in 100 gm. units to 100 gm. of the water absorption base with further blending then cooling the mixture to 100°F to determine the maximum units of water which will not separate on standing at room temperature for 48 hours. One-ounce samples of the water absorption base at each level of Water Number up to the maximum at which the base remains completely emulsifed after 48 hours are placed in vials and heated in an oven set at 110°F. The samples are again observed after 48 hours. If the emulsion has separated during that time, the base is rejected for lack of aging stability at that Water Number. In the tables below, the figure in the best stability now represents the highest Water Number (in 100 unit steps) for which the base will not separate under the specified temperature conditions. The compositions of the invention are illustrated in the following examples, 1 – 23 in Table I. Superior compositions are shown by Examples Nos. 10, 11 and 17 and represent the compositions referred to above.

TABLE I

| Material | Example No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Protopet 1-S Reg. | 92.70 | 92.70 | 92.70 | 91.70 | 90.70 | 94.70 | 95.00 | 93.70 | 90.00 | 91.20 | 87.70 | 89.70 |
| Protopet 1-S Long Fiber | — | — | — | — | — | — | — | — | — | — | — | — |
| Protopet 2-L Long Fiber | — | — | — | — | — | — | — | — | — | — | — | — |
| Amojel Snow White | — | — | — | — | — | — | — | — | — | — | — | — |
| Amojel Long Fiber | — | — | — | — | — | — | — | — | — | — | — | — |
| Penreco Short Fiber | — | — | — | — | — | — | — | — | — | — | — | — |
| Penreco Medium Fiber | — | — | — | — | — | — | — | — | — | — | — | — |
| Penreco Long Fiber | — | — | — | — | — | — | — | — | — | — | — | — |
| Stearyl Alcohol | 0.65 | 0.65 | 0.65 | 0.65 | 0.65 | 0.65 | 0.45 | 0.65 | 0.89 | 0.65 | 0.65 | 0.65 |
| Cetyl Alcohol | 0.65 | 0.65 | 0.65 | 0.65 | 0.65 | 0.65 | 0.45 | 0.65 | 0.89 | 0.65 | 0.65 | 0.65 |
| Sorbitan Monooleate | 5.00 | — | 5.00 | 5.00 | 5.00 | 3.00 | 3.42 | 3.00 | 6.85 | 6.00 | 7.00 | 8.00 |
| Ethoxylated Oleic Acid (3 moles ethylene oxide) | — | 5.00 | — | — | — | — | — | — | — | — | — | — |
| Glycerol Monooleate | 1.00 | 1.00 | — | 2.00 | 3.00 | 1.00 | 0.68 | 2.00 | 1.37 | 1.50 | 2.00 | 1.00 |
| Glycerol Monolaurate | — | — | 1.00 | — | — | — | — | — | — | — | — | — |
| Water No.-48 hrs. at 77°F | 600 | 400 | 400 | 800 | 800 | 400 | 600 | 800 | 900 | 900 | 800 | 400 |
| Heat Stability (Water No.-48 hrs. at 110°F) | 600 | 400 | 400 | 600 | 600 | 400 | 400 | 400 | 600 | 800 | 800 | 400 |
| | 13 | 14 | 15 | 16 | 17 | 18 | 19 | 20 | 21 | 22 | 23 | |
| Protopet 1-S Reg. | 92.00 | 85.00 | — | — | — | 91.00 | — | — | — | — | 92.60 | |
| Protopet 1-S Long Fiber | — | — | — | — | — | — | — | — | — | — | — | |
| Protopet 2-L Long Fiber | — | — | 92.70 | — | — | — | 92.70 | — | — | — | — | |
| Amojel Snow White | — | — | — | 92.20 | — | — | — | — | — | — | — | |
| Amojel Long Fiber | — | — | — | — | 92.70 | — | — | — | — | — | — | |
| Penreco Short Fiber | — | — | — | — | — | — | — | 92.70 | — | — | — | |
| Penreco Medium Fiber | — | — | — | — | — | — | — | — | 92.70 | — | — | |
| Penreco Long Fiber | — | — | — | — | — | — | — | — | — | 92.70 | — | |
| Stearyl Alcohol | 1.00 | 1.33 | 0.65 | 0.65 | 0.65 | 1.5 | 0.65 | 0.65 | 0.65 | 0.65 | 0.65 | |
| Cetyl Alcohol | 1.00 | 1.33 | 0.65 | 0.65 | 0.65 | 1.5 | 0.65 | 0.65 | 0.65 | 0.65 | 0.65 | |
| Sorbitan Monooleate | 5.00 | 10.28 | 5.00 | 5.00 | 5.00 | 5.00 | 5.00 | 5.00 | 5.00 | 5.00 | 5.00 | |
| Ethoxylated Oleic Acid (3 moles ethylene oxide) | — | — | — | — | — | — | — | — | — | — | — | |
| Glycerol Monooleate | 1.00 | 2.06 | 1.00 | 1.00 | 1.00 | 1.00 | 1.00 | 1.00 | 1.00 | 1.00 | 1.00 | |
| Propylparaben | — | — | — | — | — | — | — | — | — | — | 0.1 | |
| Water No.-48 hrs. at 77°F | 600 | 1000 | 400 | 400 | 800 | 400 | 600 | 600 | 400 | 400 | 400 | |
| Heat Stability (Water No.-48 hrs at 110°F) | 400 | 600 | 400 | 400 | 800 | 400 | 400 | 600 | 400 | 400 | 400 | |

In Table II below, each of the Examples 24 – 32 are directed to a composition in which one or more of the essential ingredients have been omitted, substituted by another material or reduced below the level of the operative range and it will be noted that the Water Number is below 400 or the composition is not stable as indicated by the aging test. From Example No. 29, it will be observed that petrolatum alone has a Water Number less than 10 and is therefore not useful as a water absorption base.

TABLE II

| Material | Example No. | | | | | | | | |
|---|---|---|---|---|---|---|---|---|---|
| | 24 | 25 | 26 | 27 | 28 | 29 | 30 | 31 | 32 |
| Protopet 1-S Reg. | 92.70 | 92.70 | 92.70 | 94.00 | 98.70 | 100.00 | — | — | — |
| Protopet 2-L Long Fiber | — | — | — | — | — | — | 99.00 | 96.20 | 97.70 |
| Stearyl Alcohol | 0.65 | 0.65 | 0.65 | — | 0.65 | — | — | 0.65 | 0.65 |
| Cetyl Alcohol | 0.65 | 0.65 | — | — | 0.65 | — | — | 0.65 | 0.65 |
| Sorbitan Monooleate | — | — | — | 5.00 | — | — | — | 1.50 | — |
| Sorbitan Monolaurate | — | 5.00 | — | — | — | — | — | — | — |
| Glycerol Monooleate | 1.00 | 1.00 | 1.00 | 1.00 | — | — | 1.00 | 1.00 | 1.00 |
| Diethylene Glycol Monostearate | 5.00 | — | — | — | — | — | — | — | — |
| Polyethylene Glycol Monooleate | — | — | 5.00 | — | — | — | — | — | — |
| Water No. - 48 hrs. at 77°F | 200 | <200 | 200 | 200 | 200 | <10 | 200 | 400 | 400 |
| Heat Stability (Water No. - 48 hrs. at 110°F) | 200 | <200 | <200 | 200 | 200 | <10 | 200 | 200 | <200 |

In Table III below the Water Numbers of lanolin and a number of modified lanolins now generally available on the market have been determined in the same manner described about to provide a direct comparison to the compositions of the invention. Although it will be noted that some of the modified lanolins exhibit elevated temperature stability, Water Numbers greater than 400, they are more costly than the compositions described herein. Furthermore, while the modified lanolins are less allergenic than lanolin, they do not entirely eliminate the reported allergenic reactions. The lanolin odor that is often objectionable in pharmaceutical and cosmetic preparations is still evident in many modified lanolin products, but is totally absent from the composition of the invention.

TABLE III

| Product | Maximum Water Number Stable for 48 Hours at 110°F |
|---|---|
| Example 10 | >800 |
| lanolin-USP (Croda) | 200 |
| modified lanolin (Amerchol CPI) | <400 |
| modified lanolin (Forlan-RITA) | <600 |
| modified lanolin (Amerchol CAB-CPI) | <600 |
| modified lanolin (Amerchol H-9 - CPI) | <600 |
| modified lanolin (Amerchol 400 - CPI) | <600 |
| modified lanolin (Lanalan-Lanatex) | <600 |
| modified lanolin (Lanatex L-15 - Lanatex) | <200 |
| modified lanolin (Amerchol BL-RITA) | <400 |
| modified lanolin (Ritachol-RITA) | <400 |
| modified lanolin (Lanatex LP - Lanatex) | <200 |

Using the composition of Example 23, a hand creme (Example 33), a creme lotion (Example 34), a night creme (Example 35), and a hand and body lotion (Example 36), respectively were prepared by blending the ingredients indicated in Table IV in the proportions by weight indicated.

TABLE IV

| Material | Example No. | | | |
|---|---|---|---|---|
| | 33 | 34 | 35 | 36 |
| Promulgen D (Robinson-Wagner) | 3.5 | — | — | — |
| Glycerol Monostearate (Kessco GMS SE- Armak Company) | 3.0 | 2.0 | 2.0 | — |
| Carnation Mineral Oil | 12.0 | 5.0 | 7.0 | 6.0 |
| Base of Example 23 | 3.0 | 3.0 | 3.0 | 3.0 |
| Stearyl Alcohol | 5.0 | — | 2.0 | — |
| Methyl Paraben | 0.1 | 0.1 | 0.1 | 0.1 |
| Propyl Paraben | 0.1 | 0.05 | 0.1 | 0.1 |
| Glycerin | 5.0 | 3.0 | — | 5.0 |
| Polawax (Croda) | — | 3.0 | — | — |
| Cetyl Alcohol | — | 1.0 | — | — |
| Stearic Acid (Neo-Fat 18-55 (Armak Company)) | — | — | 11.0 | 3.0 |
| Triethanolamine | — | — | 1.5 | 1.0 |
| Cetyl Palmitate (Kessco X-653 Armak Company) | — | — | — | 2.0 |
| Deionized Water | 68.3 | 82.85 | 73.3 | 79.8 |

What is claimed is:

1. A water absorption base for cream and lotion cosmetic formulations, consisting essentially of:
   a. from 1.5 to 10% by weight of a member of the group consisting of sorbitan monooleate and oleic acid ethoxylated with about 3 moles of ethylene oxide;
   b. from 0.6 to 3.0% by weight of a member of the group consisting of glycerol monooleate and glycerol monolaurate;
   c. from 0.45 to 1.5% by weight of stearyl alcohol;
   d. from 0.45 to 1.5% by weight of cetyl alcohol; and
   e. balance at least 75% by weight of a fiber petrolatum; said water absorption base having a capability of forming a stable water-in-oil emulsion in a ratio of 100 parts of base to at least 400 parts of water, by weight, said emulsion showing no separation when held both at 77°F and 110°F for a minimum period of 48 hours.

2. The water absorption base of claim 1 wherein the amount of petrolatum is from 85 to 90% by weight of the composition.

3. A water absorption base for cream for lotion cosmetic formulations, consisting essentially of:
   a. 6% by weight of sorbitan monooleate;
   b. 1.5% by weight of glycerol monooleate;
   c. 0.6% by weight of cetyl alcohol;
   d. 0.6% by weight of stearyl alcohol; and
   e. balance about 90% by weight of a fiber petrolatum; said water absorption base having a capability of forming a stable water-in-oil emulsion in a ratio of 100 parts of base to 800 parts of water, by weight, said emulsion showing no separation when held both at 77°F and 110°F for a minimum period of 48 hours.

* * * * *